May 14, 1968  J. R. DAVIS ET AL  3,383,686
DIVERSE FREQUENCY ECHO DETECTION SYSTEM
WITH DOPPLER FREQUENCY COHERENCE
Filed Jan. 30, 1967  6 Sheets-Sheet 4

INVENTORS
JOHN R. DAVIS
JAMES M. HEADRICK
IRVING H. PAGE

BY *Kenneth C. Jacobs* AGENT

*R. S. Sciascia* ATTORNEY

FIG. 7a

FIG. 7b 3,383,686
DIVERSE FREQUENCY ECHO DETECTION SYSTEM WITH DOPPLER FREQUENCY COHERENCE
John R. Davis, Alexandria, Va., James M. Headrick, Beltsville, and Irving H. Page, Oxon Hill, Md., assignors to the United States of America as represented by the Secretary of the Navy
Filed Jan. 30, 1967, Ser. No. 613,074
10 Claims. (Cl. 343—14)

ABSTRACT OF THE DISCLOSURE

A system for extending the unambiguous range of pulse echo detection systems without reducing the pulse repetition frequency by sequentially transmitting diverse double sideband frequencies spaced about a single carrier frequency. Echo Doppler coherence is preserved in that the echoes from the different pulses are referred to the same reference frequency (the carrier), and since both frequency and phase coherence are preserved the successively returned signals may be combined for further processing. The frequencies used may be selected randomly if desired.

The invention described herein may be manufactured and used by or for the Government of the United States of America for governmental purposes without the payment of any royalties thereon or therefor.

Background of the invention

The present invention relates to a pulse echo detection system and particularly to a system with an extended unambiguous range.

Due to the dichotomous nature of simultaneous unambiguous measurement of both target range and target velocity, most radar systems have been subject to a serious design comprise. The system's ability to unambiguously measure the velocity of a rapid target is limited by the rate at which it transmits its pulses. For example, a system which emits signals at a pulse repetition frequency (PRF) of S pulses per second may unambiguously measure target velocity only for targets which give rise to a Doppler shift in the radar return of less than $S/2$ cycles per second. On the other hand the system's ability to unambiguously measure the range of a target is limited by the period between its pulses (i.e., the reciprocal of the PRF). Thus a radar which emits energy at a PRF of S pulses per second may unambiguously measure target ranges only for targets which give rise to echoes whose delay is less than $1/S$ seconds from the transmitted pulse (i.e., whose range is within a limit imposed by this maximum unambiguous delay). Targets beyond this maximum range will give rise to false range indications.

Radar systems in the past have been subject to a design compromise because of this situation. Systems whose primary objective has been the unambiguous determination of target velocity have been operated at a high PRF, and the false range indications of remote targets have been accepted as system limitations. These systems have often operated in two modes, a primary (high PRF) mode in which unambiguous velocity measurements have been achieved at the expense of range errors, and an alternate (low PRF) mode in which the PRF has been lowered temporarily for unambiguous range measurements at the expense of velocity errors. This multiple-mode scheme has resulted in a loss in information rate during the secondary (low PRF) mode, and has thus degraded the radar performance. Radars whose primary objective has been the measurement of target range have been operated at a low PRF, and the erroneous velocity measurements of rapid targets have been eliminated by tracking these targets for periods and comparing the changes in target range with time. Both of these techniques are unacceptable for a system which must continuously make both target range and velocity measurements.

One possible method for eliminating range ambiguity without a reduction in PRF involves altering the transmitted frequency between pulses and sorting the target returns into separate receiving sections. Since the Doppler frequency varies with the transmitted frequency, this method of frequency shifting between pulses imparts a pulse-to-pulse incoherence to the Doppler information carried by the different frequency echoes, and hence the analysis system cannot provide the full processing gain which it provides with a frequency coherent pulse-Doppler signal. In brief, each echo corresponding to a different transmitted frequency actually conveys Doppler information which is entirely independent of the other returns. The system then merely furnishes data from a number of these separate radar signals, the number being equal to the number of different frequencies used. Each different frequency transmission then provides its information at the system information rate divided by the number of frequencies in use. Thus the same degradation of the available unambiguous Doppler information results from this method as would result from simply reducing the pulse repetition frequency.

Summary of the invention

In order to avoid the loss of available Doppler sensitivity and yet reduce the penalty in range ambiguity which results from the use of a high PRF, a means is necessary to provide pulse to pulse Doppler coherence between transmitted pulses. The present invention solves this problem by changing the transmitted frequencies from pulse to pulse in such a manner that the Doppler information is referred to a single reference frequency. In this way a pulse returning from a distant target will not be confused with a later transmitted pulse returning from a nearby target because the two pulses will contain different frequency spectrums. However, this change in frequency spectrums does not destroy the pulse-to-pulse Doppler coherence because all the pulses transmitted are made up of paired sidebands which are centered about a common carrier frequency. All the Doppler information is referred to this constant carrier frequency and therefore a Doppler frequency is developed which does not change from pulse to pulse.

In this way the unambiguous range of the system is extended by a factor equal to the number of different double-sideband steps contained in the transmitted pulse sequence.

In addition to obtaining a Doppler frequency which does not vary from pulse to pulse even though the transmitted frequencies change, the present invention also maintains phase coherence between the successively received pulses. This type of coherence is useful not only in moving target indicator systems but also in fixed target systems. For example, U.S. Patent No. 3,274,594, issued Sept. 20, 1966 to Robert M. Page discloses a system for storing the radio frequency signals returned from successively emitted pulses and playing back these signals in rapid succession with a very minimum of time spacing therebetween. Such operation place successive echo pulses in a substantially uninterrupted time sequence, and when this is done with a condition of phase correspondence existing between the waves of successive pulses the signal variations introduced into a narrow bandwidth amplifier circuit by one signal will be continued and reinforced by succeeding signals. The effect will be that of lengthening the duration of the pulse and hence reducing the bandwidth required for amplifier reproduction thereof. The unambiguous range of such a system could be extended by successively transmitting diverse double-sideband-suppressed-carrier pulses as taught by the present invention An object of the present invention is to provide a pulse echo detection system wherein a high PRF may be used without reducing the unambiguous range of the system.

Another object is to extend the unambiguous range of a pulse echo system without reducing the PRF.

A further object of the invention is to provide a radar system employing frequency-diversity for the avoidance of electronic countermeasures.

Still another object is to provide an MTI (moving target indicator) system where plural consecutive frequencies are transmitted and the received Doppler information is referred to a single constant frequency.

Yet another object of the present invention is a system achieving frequency diversity without degrading the Doppler coherence in the echoes.

A still further object of the present invention is a frequency diverse system wherein the frequency of the transmitted signals may be varied randomly.

*Brief description of the drawing*

Other objects and many of the attendant advantages of this invention will be readily appreciated as the same becomes better understood by reference to the following detailed description when considered in connection with the accompanying drawings in which like reference numerals designate like parts throughout the figures thereof and wherein.

*Description of the preferred embodiments*

The invention will be described with particular attention to a radar form of pulse-echo apparatus, however, the general principles are equally applicable to other forms of apparatus such as sonar or underwater sound systems.

It will be understood by those skilled in the art that although separate antennas have been indicated for transmitting and receiving, this is done merely for illustrative purposes and that, if desired, a single antenna may be used and connected to the receiver and transmitter sections through suitable duplexing circuits.

Figure 1:
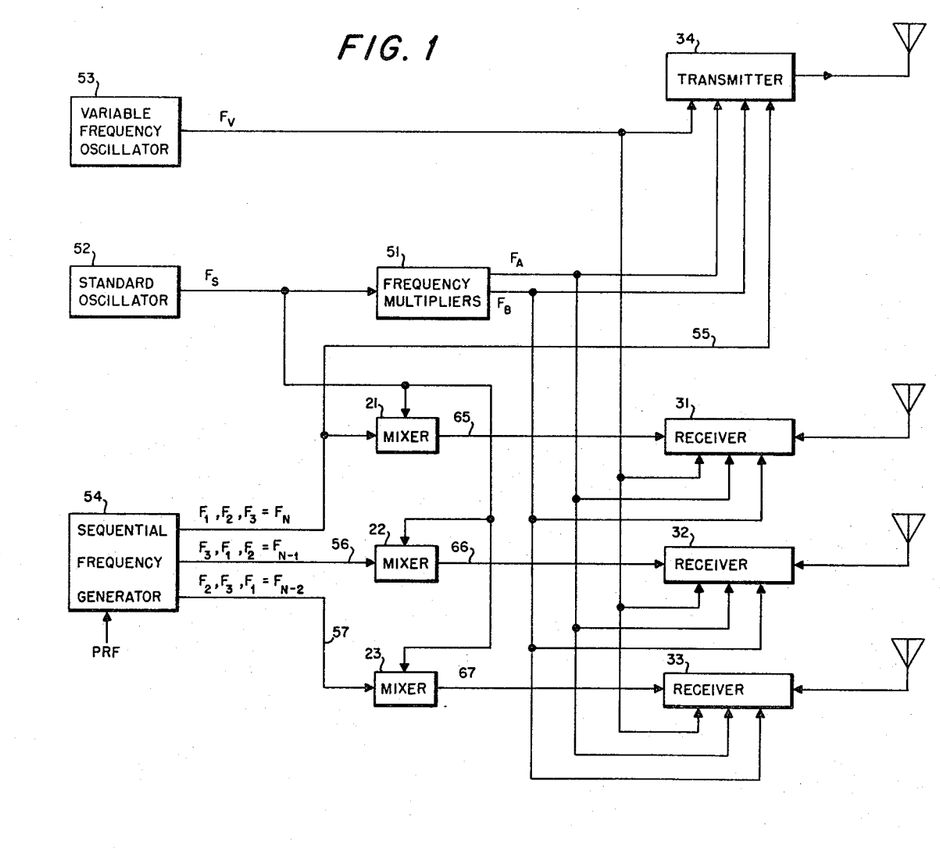
FIG. 1 shows a block diagram of a preferred embodiment of the invention.

FIG. 1 shows a block diagram of a preferred embodiment of the overall system. The system shown is designed to divide the field being observed into three range intervals, and therefore three distinguishable types of pulses are transmitted sequentially. Each of these pulses is of the double-sideband-suppressed-carrier type having a common carrier frequency but differing in the side frequencies transmitted. The returned echo signals are mixed with locally generated signals in three receiver sections. Each of these receiver sections is designed to respond to signals from an assigned range while ignoring echoes returned from targets outside this range. Thus, in FIG. 1, receiver 31 responds to echoes from targets in the nearest range, while receiver 32 responds to echoes from an intermediate range, and receiver 33 responds to the farthest range. The range limits are determined by the time interval between pulses. For example, if the PRF is 180 p.p.s. a signal can travel to a target 455 nautical miles away and return before a new pulse is transmitted. This sets the first range between zero and 455 miles, while the second becomes 455 to 910 miles, and the third range is 910 to 1365 miles.

The various receiver sections respond only to their assigned ranges because each is supplied with a locally produced sequence of frequencies which is displaced in time with respect to the others.

Figure 5:
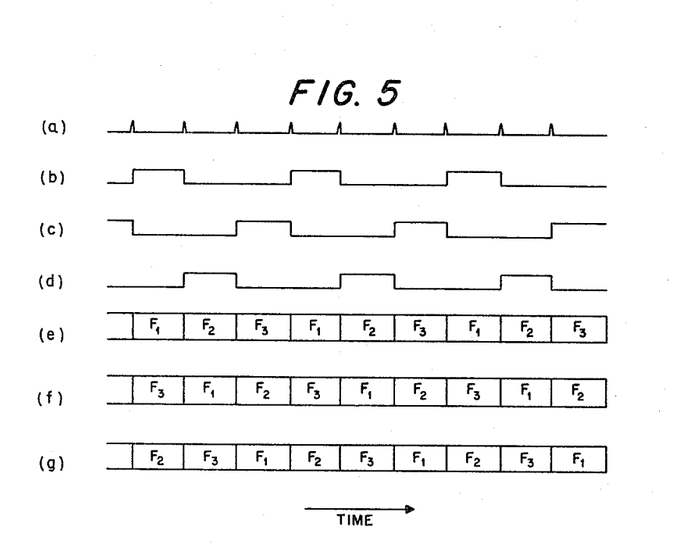
FIG. 5 shows a diagram of the waveforms associated with sequential frequency generator 54 of FIG. 4.

FIG. 5(e)–(g) will help illustrate this point. The signals on output lines 55, 56, 57 of sequential frequency generator 54 are shown on lines (e), (f), (g) respectively of FIG. 5. These frequencies are shifted upward a fixed amount by mixing them with frequency $F_s$ in mixers 21, 22, 23 and then are applied to receivers 31, 32, 33, respectively. It can be seen that there is a constant frequency difference between the signals supplied on line 65 to receiver 31 and the signals transmitted by transmitter 34. Likewise it can be seen that signals on lines 66 and 67 are similar to those on line 65 except for appropriate displacements in time. In fact the signal on line 66 is identical to that on line 65 except that it lags by an amount equal to the time between pulses (i.e., the reciprocal of the PRF) and the signal on line 67 lags by twice this amount.

These time differences between the local frequencies applied to the different receivers make these receivers responsive to echo signals which are delayed by different amounts. Thus receiver 31 will be responsive to echoes returned from nearby targets because the returned frequencies will shift up and down in unison with the local frequencies fed into receiver and the resulting difference frequency will be passed by an appropriate band-pass filter. The same receiver will not respond to more distant targets because the returned echo frequencies will not move in unison and the resulting difference frequencies will not pass through the band-pass filter. Receivers 32 and 33 operate in a similar manner to be responsive only to their assigned ranges.

Figure 2:
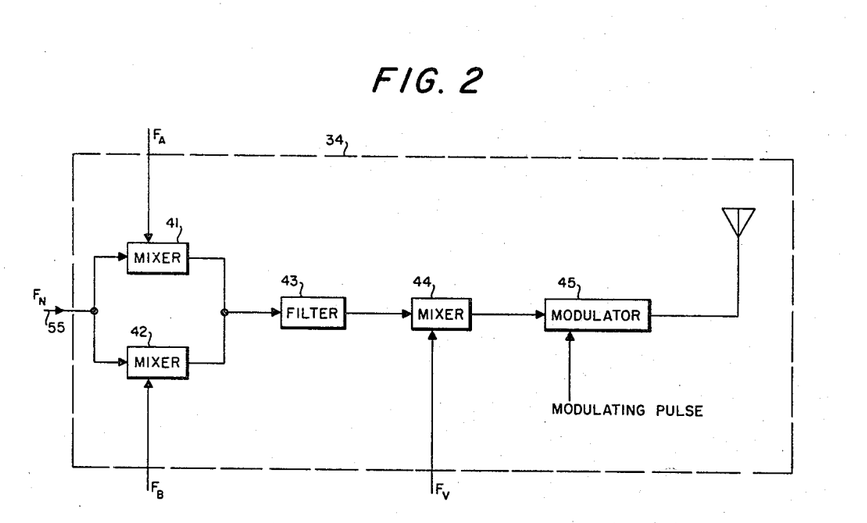
FIG. 2 shows a diagram of transmitter section 34 shown in FIG. 1.
Figure 6:
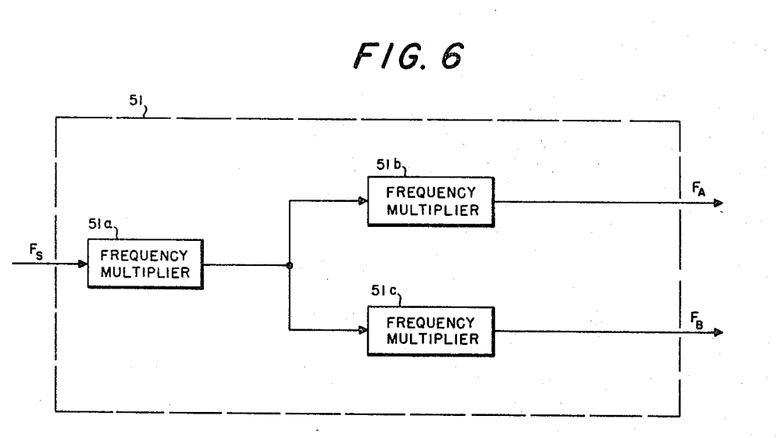
FIG. 6 shows a diagram of frequency multiplying section 51 of FIG. 1.

To create the various side frequencies, sequential frequency generator 54 produces a repetitive sequence of frequencies $F_1$, $F_2$, $F_3$, $F_1$, $F_2$, etc., on line 55 which introduces this sequence to transmitter section 34. As shown in FIG. 2 the transmitter section includes a balanced modulator circuit made up of mixers 41 and 42 which mix the signal on line 55 with two frequencies $F_A$ and $F_B$ equidistantly spaced above and below a subcarrier frequency $F_K$. These two frequencies $F_A$ and $F_B$ are produced from a single standard oscillator 52 by means of frequency multipliers 51. As shown in FIG. 6 the frequency multipliers may comprise a plurality of multipliers which multiply the applied frequency by different amounts. Since the multiplication factor of multiplier 51b is greater than that of multiplier 51c, frequency $F_A$ will be higher than frequency $F_K$, and $F_B$ will be lower than this frequency.

For convenience in the description which follows the frequency sequence $F_1$, $F_2$, $F_3$, $F_1$, $F_2$, etc., will be referred to as $F_N$, it being understood that this is not a single frequency but a sequence of different frequencies as shown in FIG. 5(e). Similarly the frequencies shown in FIG. 5(f) and (g) may be referred to as $F_{N-1}$ and $F_{N-2}$.

Frequency sequence $F_N$ is applied to mixers 41 and 42 where it is mixed with frequencies $F_A$ and $F_B$ respectively. The resulting sum and difference frequencies $(F_A+F_N)$, $(F_A-F_N)$, $(F_B+F_N)$, and $(F_B-F_N)$ are sent to a band-pass filter 43 which passes only the two frequencies nearest the suppressed subcarrier, i.e., $(F_A-F_N)$ and $(F_B+F_N)$.

Before transmission these two frequencies are mixed with frequency $F_V$ from variable frequency oscillator 53 and finally pulse modulated in modulator 45 so that the finally transmitted frequencies are $(F_A+F_V-F_N)$ and $(F_B+F_V+F_N)$ which are equally spaced on opposite sides of a suppressed carirer, $F_C=\frac{1}{2}-(F_A+F_B)+F_V$. The frequency of the variable frequency oscillator is held constant during operation but may be changed for various purposes such as to avoid radar jamming signals.

If the transmitted frequencies are reflected by an object moving radially with respect to the transmitter, they are shifted an amount which varies with the frequency transmitted according to the following equation, (3) $$f_d = f_t\left(\frac{c+v}{c-v}\right) - f_t \approx \frac{2v}{c} f_t$$

where:

$f_d$=Doppler frequency in cycles/second
$f_t$=transmitted frequency in cycles/second
$v$=target radial velocity in miles/hour
$c$=speed of propagation in miles/hour In the present case if frequencies $(F_A+F_V-F_N)$ and $(F_B+F_V+F_N)$ are transmitted and the reflecting object is approaching with a radial velocity $v$, the returned frequencies are $$\left((F_A+F_V-F_N)+\frac{2v}{c}(F_A+F_V-F_N)\right)$$

and $$\left((F_B+F_V+F_N)+\frac{2v}{c}(F_B+F_V+F_N)\right)$$

Figure 3:
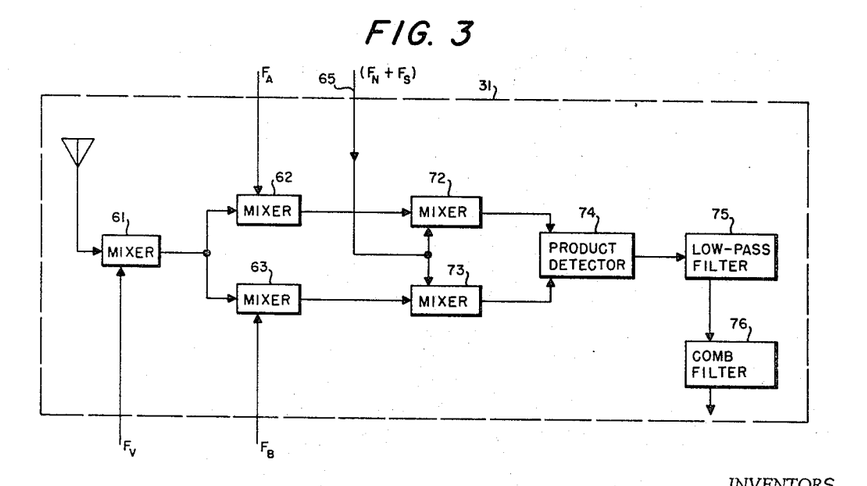
FIG. 3 shows a diagram of receiver section 31 shown in FIG. 1.

These returned frequencies are fed in parallel to all three receiver sections 31, 32, 33 where they are mixed with locally generated signals to derive the desired information. Since all three receivers operate in similar manners the operation of only receiver 31 will be described with reference to FIG. 3. The returned frequencies are first mixed in mixer 61 where $F_V$ is subtracted from each leaving $$\left(F_A-F_N+\frac{2v}{c}(F_A+F_V-F_N)\right)$$

and $$\left(F_B+F_N+\frac{2v}{c}(F_B+F_V+F_N)\right)$$

Next these signals are applied separately to mixers 62 and 63, and the resulting difference frequencies are $$\left(F_N-\frac{2v}{c}(F_A+F_V-F_N)\right)$$

and $$\left(F_N+\frac{2v}{c}(F_B+F_V+F_N)\right)$$

These frequencies are then separately mixed in mixers 72 and 73 with frequency $(F_N+F_S)$, where $F_S$ is the standard oscillator frequency produced by oscillator 52. A difference frequency $$\left(F_S+\frac{2v}{c}(F_A+F_V-F_N)\right)$$

is obtained from mixer 72 while difference frequency $$\left(F_S-\frac{2v}{c}(F_B+F_V+F_N)\right)$$

is obtained from mixer 73.

The outputs from these mixers are then applied to product detector 74 which in conjunction with low pass filter 75 produces a difference frequency $$\left(\frac{2v}{c}(F_A+F_V-F_N)+\frac{2v}{c}(F_B+F_V+F_N)\right)=$$

$$\frac{2v}{c}(F_A+F_B+2F_V)$$

Since the suppressed subcarrier frequency $F_K$ is equidistant between frequencies $F_A$ and $F_B$, i.e $$F_K=\frac{1}{2}(F_A+F_B)$$

the difference frequency output of filter 75 may be rewritten as $$\frac{4v}{c}(F_K+F_V)$$

It can be seen that this frequency, which contains the necessary Doppler information, is dependent only upon the suppressed carrier frequency $F_C=(F_K+F_V)$ and not upon the side frequencies. Thus, for a given target velocity and carrier frequency the derived Doppler signal frequency is constant even though the side frequencies are varied.

The above operation was described as if only two pure side tones were present in each transmitted and reflected signal, but in actual practice the pulse modulating process introduces a number of harmonically related spectral components into these signals. These components are spaced at frequency intervals equal to the pulse repetition frequency and their presence does not materially change the analysis presented above. Comb-filter 76 may be used to remove non-Doppler-shifted echoes due to clutter from all of these harmonically related components. U.S. Patent No. 3,170,120, issued Feb. 16, 1965 to Gerold K. Jensen shows a type of comb-filter which may be used.

Figure 7A:
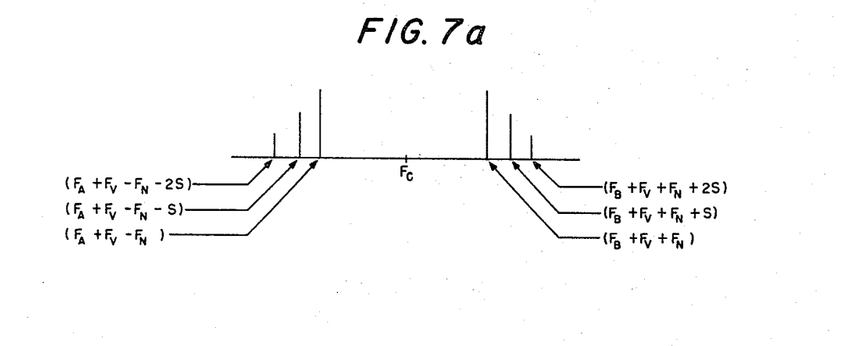
FIGS. 7(a) and (b) show representations of frequency spectrums of two possible types of DSSC signals used in the invention.

Generation of the double-sideband components may be accomplished by any of several well-known balanced modulator techniques. However, optimum efficiency in use of the transmitted energy will be achieved if each component is constructed as shown in FIG. 7(a). In this illustration, each sideband is seen to be composed of several spectral lines, separated in frequency by the PRF(s). Each sideband is, in fact, a single-sideband portion representing one-half the equivalent untranslated energy spectrum which would appear about $F_c$ if the sideband-splitting operation were not performed. This configuration represents the desired embodiment of the invention.

Figure 7B:
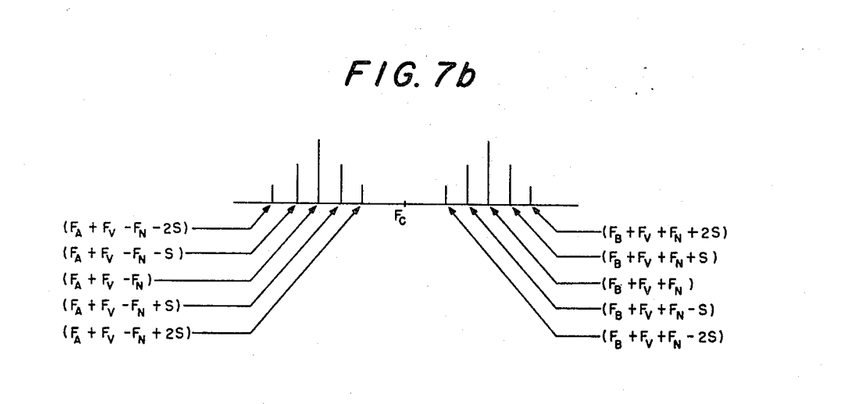

FIG. 7(b) shows a second embodiment of this invention in which each sideband is in fact, a replica of the entire equivalent untranslated energy spectrum. This embodiment is a valid embodiment of the invention, and is more easily implemented, with uncomplicated circuitry, than the embodiment of FIG. 7(a). This second embodiment does result in inefficient use of transmitted energy, however, in that approximately one-half of the spectral lines in each sideband convey redundant information.

Figure 4:
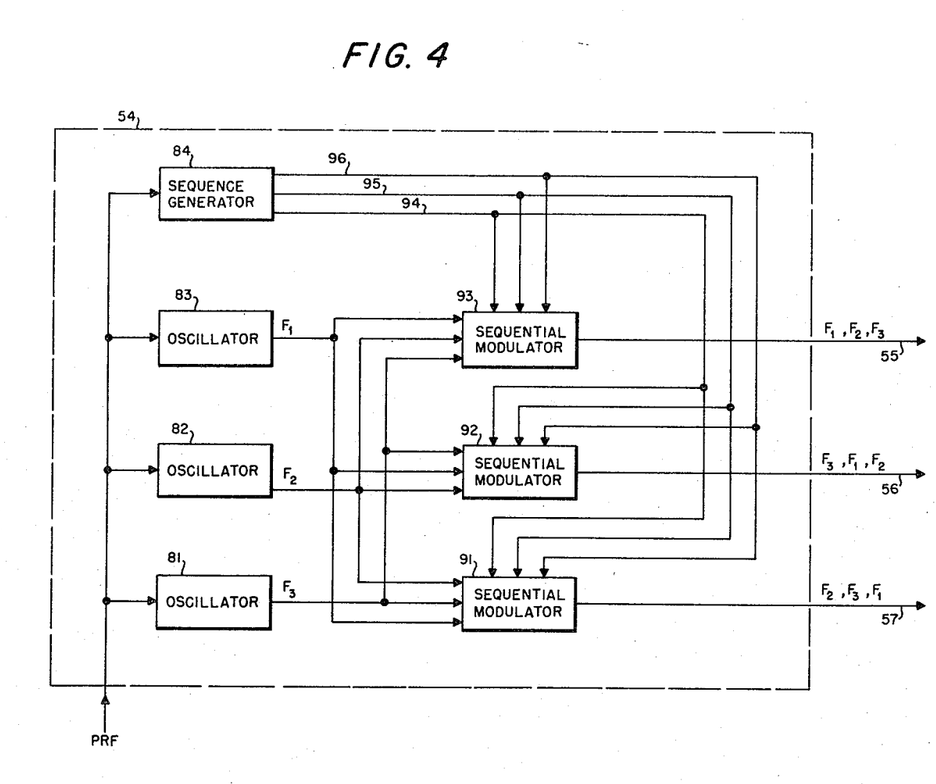
FIG. 4 shows a diagram of sequential frequency generator 54 shown in FIG. 1.

A few remarks concerning the electronic circuits and filter networks used in the preferred embodiments of the system are appropriate. The sequential frequency generator 54 may be constructed as shown in FIG. 4 where oscillators 81, 82, 83 may be crystal oscillators which are phase locked to the system PRF to avoid indepedent drifts in frequency. The three separate frequencies $F_1$, $F_2$, $F_3$ are generated continuously by oscillators 81, 82, 83 and gated sequentially onto lines 55, 56, 57. These three lines carry the same three frequencies sequentially but at a given time each line is carrying a different frequency as is shown in FIG. 5(e)–(g) where diagrams (e), (f) and (g) represent the outputs on lines 55, 56 and 57 respectively.

Sequence generator 84 uses the system PRF (shown in FIG. 5(a)) to construct three different three-step switching or gating signals, each with one interpulse interval on and two interpulse intervals off, as illustrated in FIG. 5(b)–(d) where rows (b), (c) and (d) represent the waveforms on lines 96, 95 and 94 respectively. These three-step switch signals are applied as gating waveforms to sequential modulators 91–93, each of which has a separate input channel for each of the three crystal oscillator signals and a separate input channel for each of the three sequence generator waveforms as well as a single output channel for the three-step sequence of crystal oscillator frequencies created by applying the three gating waveforms to the crystal oscillator signals. The waveform generators and gating circuits may be constructed in various known ways. U.S. Patent No. 2,817,832, issued to Robert H. Mathes on Dec. 24, 1957 discloses one possible way to implement these circuits.

Another possible way to construct sequential frequency generator 54 would be to use a plural tone generator such as a magnetic drum, disc, tape, etc. on which the three frequencies appear sequentially along a single track. Three pick-up heads, one for each line 55, 56, 57 would sequentially pick-up the three frequencies as shown in FIG. 5(e)–(g). The positions of these heads along the track could be adjustable so that the exact locations of the various range intervals could be changed. A separate pick-up head would then be used to provide the signal to the transmitter. The plural tone generator could contain several parallel tracks so that the frequencies as well as their sequences could be changed.

Each of the frequency multipliers may comprise a pentode, which is driven at cutoff, followed by a capacitor-coupled single-tuned triode amplifier, and two transformer-coupled triode amplifier stages. Other types of frequency multipliers could be used such as those set forth in Waveforms, by Britton Chance et al., McGraw-Hill Book Co., 1949, pages 545–556. Of course solid state frequency multipliers could also be used.

Mixers 21, 22, 23 may be suppressor-grid-driven pentode mixers, followed by stagger-tuned pentode amplifier stages tuned to equalize the response of the circuit to all three frequencies in the sequence.

The balanced modulator circuit comprising mixers 41, 42 and filter 43 may include a pair of single-tuned capacitor-coupled suppressor-grid-driven pentode mixer stages, followed by a band-pass filter, a transformer-coupled pentode amplifier, and a double-tuned capacitor-coupled pentode amplifier.

Product detector 74 may be composed of a pair of cathode followers driving a third triode which shares its cathode resistor with the two cathode followers. An example of such a circuit is shown in The Radio Amateur's Handbook, 41st edition, 1964, page 90, FIGS. 5–6(A).

The above circuit details have been described merely as examples and not as limitations on the scope of the invention. The technical literature is replete with various mixers, filters, multipliers, etc. from which one skilled in the art could choose to carry out the present invention depending upon the specific frequencies chosen for operation.

The preferred embodiment shows three frequency pairs being transmitted but it should be clear that two, four or more frequency pairs could be used. Also an effective fourth sideband pair could be provided simply by transmitting a pulse at the actual center frequency as a fourth step in the sequence. Alternatively, one of the three frequencies $F_1$, $F_2$, $F_3$ could be equal to ½ $(F_A-F_B)$ so that the sequence of three pulses transmitted would include two pulses each comprising a unique sideband pair and a third pulse comprising the carrier frequency itself. The returned echoes would be processed as explained above and all the Doppler information would again be referred to the constant carrier frequency.

Figure 8:
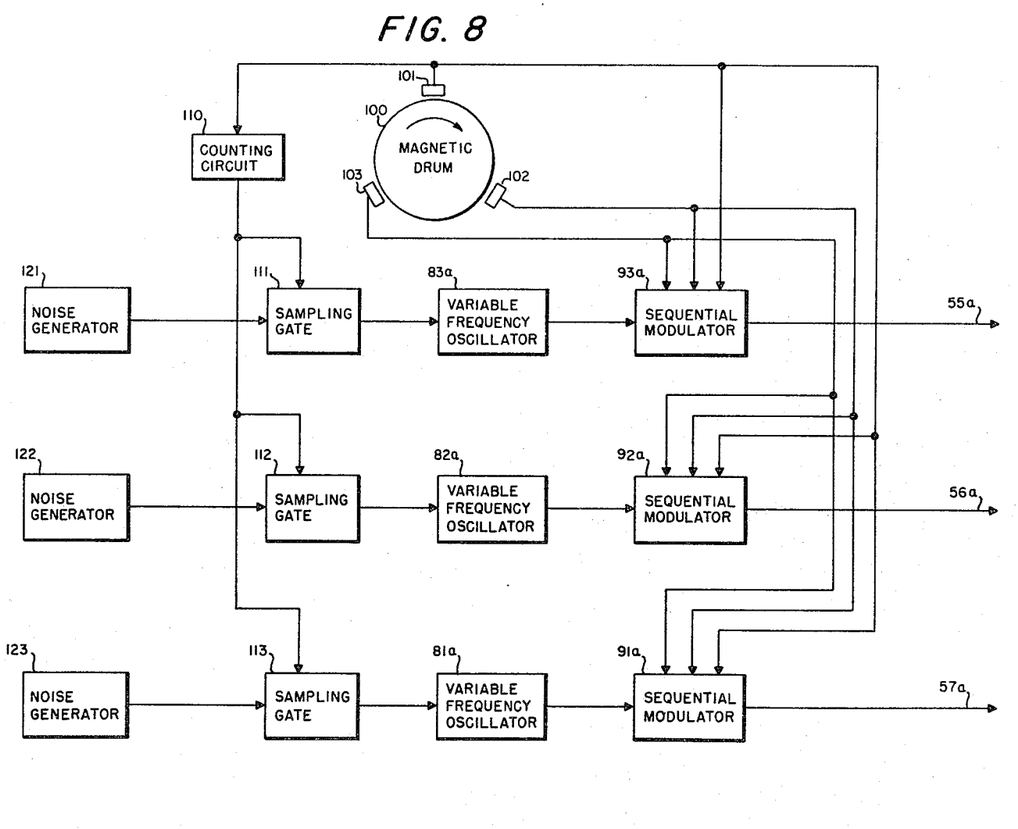
FIG. 8 shows a random sequential frequency generator to be used in a modified form of the invention.

The fixed sequence of frequencies as set out in the preferred embodiment is not required for practicing the invention. The frequency selection may be done randomly and this would tend to intensify the ECM (electronic counter measures) problem for a hostile listener. The random feature could be exhibited either in the separation of the sideband pairs from the constant reference frequency or in the order in which the sideband pairs are transmitted. An embodiment of the first type may be illustrated with reference to FIG. 8 which shows a random sequential frequency generator for use instead of frequency generator 54 of FIGS. 1 and 4. Fixed oscillators 81, 82, 83 have been replaced by variable oscillators 81a, 82a, 83a. One possible method of implementing these oscillators would be by the use of the frequency generators disclosed in U.S. Patent No. 2,868,973, issued to Gerold K. Jensen on Jan. 13, 1959. This patent shows a generator whose frequency can be discretely varied over a wide range by changing the positions of a plurality of switches. For our purpose these switches could be a plurality of electronic devices whose states are set by a voltage level input. As illustrated in the present FIG. 8 this controlling voltage can be obtained from a random source such as noise generators 121, 122, 123. In FIG. 8 the signals from the noise generators are sampled intermittently by sampling gates 111, 112, 113 which may be arranged to simultaneously pass signals for very short periods at regularly or irregularly spaced time intervals. One method of obtaining regularly spaced samples is illustrated by the inclusion of counting circuit 110 which counts pulses obtained from magnetic drum 100 and delivers a gating pulse to sampling gates 111, 112, 113 whenever a predetermined count is reached.

As can be seen the magnetic drum 100 and its associated read heads 101, 102, 103 perform the function of sequence generator 84 of FIG. 4. The drum could have a pre-recorded track which produces an output on head 101 similar to the waveform shown in FIG. 5(b). Heads 102 and 103 are displaced along the same track as head 101 so that they produce waveforms such as those shown in FIG. 5(c) and FIG. 5(d) respectively. These three waveforms are used to control sequential modulators 91a, 92a, 93a as described with reference to FIG. 4.

Under this embodiment the system would operate for a given period with three randomly chosen frequencies, then the variable oscillators would be reset to other randomly chosen frequencies, and this intermittent frequency changing could be continued indefinitely. Means could be included to avoid the setting of more than one of oscillators 81a, 82a, 83a simultaneously at the same frequency.

Another way to achieve random operation would be to include a large number of fixed frequency oscillators and allow a noise source (or sources) to randomly choose which oscillators are to be used at any one time.

Obviously, many other modifications and variations of the present invention are possible in light of the above teachings. For example, instead of starting with two frequencies such as $F_A$ and $F_B$ equidistantly spaced above and below a suppressed subcarrier frequency $F_K$, this subcarrier frequency itself could be generated and applied along with frequency sequence $F_N$ to a balanced modulator. The sum and difference frequencies thus produced would be handled in the same manner as described above. The returned echo signals would be mixed with frequency $F_K$ instead of $F_A$ and $F_B$, and proper filtering would be used to select the desired frequencies for further processing.

Another obvious modification to this system would be the inclusion of means to indicate both moving and stationary targets. For example, it can be seen that the output of product detector 74 includes both sum and difference frequencies $$\left(2F_S+\frac{2v}{c}(F_A-F_B)-\frac{4v}{c}(F_N)\right)$$

and $$\frac{4v}{c}(F_K+F_V)$$

The sum frequency is seen to vary with the velocity of target and for stationary targets it becomes $2F_S$. A comb filter could be used to detect these stationary targets and this information could be correlated with the moving target information in order to more accurately determine the positions of moving targets.

What is claimed and desired to be secured by Letters Patent of the United States is:

1. An echo detection system comprising:
   means to transmit a first signal comprising at least two sequential pulses whose frequency spectrums are both symmetric about a common carrier frequency, the frequency spectrum of one of said pulses containing a first pair of side frequencies different from any side frequencies contained in the other pulse and spaced a first predetermined amount on each side of said common carrier frequency;
   means to produce a second signal comprising at least two sequential portions whose frequency spectrums are both symmetric about a center frequency, the frequency spectrum of one of these signal portions containing a pair of side frequencies different from any side frequencies contained in the other of these signal portions and spaced said first predetermined amount on each side of said center frequency;
   means to receive said first signal after it is reflected from an object being detected; and
   means to compare said reflected first signal with said second signal to detect frequency differences between said signals.

2. The echo detection system of claim 1; wherein:
   the frequency spectrum of the other of said two sequential pulses contains a second pair of side frequencies different from any side frequencies contained in the first of said two sequential pulses and spaced a second predetermined amount on each side of said common carrier frequency, and
   the frequency spectrum of the other of said two sequential portions contains a second pair of side frequencies different from any side frequencies contained in the first of said two sequential portions and spaced said second predetermined amount on each side of said center frequency.

3. The echo detection system of claim 1 wherein:
   the means to transmit said first signal includes means to randomly vary said frequency spectrums of the pulses being transmitted while maintaining constant said common carrier frequency.

4. The echo detection system of claim 1; wherein:
   said first signal comprises at least a third sequential pulse whose frequency spectrum is symmetric about said common carrier frequency and contains a second pair of side frequencies different from any side frequencies contained in the other two sequential pulses and spaced a second predetermined amount on each side of said common carrier frequency;
   said second signal comprises at least a third sequential portion whose frequency spectrum is symmetric about said center frequency and contains a second pair of side frequencies different from any side frequencies contained in the other two sequential portions and spaced said second predetermined amount on each side of said center frequency;
   there is included means to produce a third signal comprising at least three sequential portions which are identical with the three sequential portions of said second signal but delayed in time with respect thereto; and
   there is a means to compare said reflected first signal with said third signal to detect frequency differences between these signals.

5. An echo detection system comprising:
   means to produce a plurality of frequencies;
   gating means to sequentially pass said frequencies;
   modulator means to receive said frequencies from said gating means to convert said frequencies into a plurality of sequentially occurring side frequency pairs in a double-sideband-suppressed-carrier signal having a constant carrier frequency;
   means to produce a second double-sideband-suppressed-carrier signal also including said plurality of frequencies converted into a plurality of sequentially occurring side frequency pairs;
   means to transmit said first signal;
   means to receive said first signal after it has been reflected by an object being detected; and
   means to compare said reflected first signal with said second signal to detect frequency differences between said signals.

6. The echo detection system of claim 5:
   including means to randomly vary said plurality of frequencies.

7. An echo detection system for detecting the radial velocity of a target in a given range interval comprising:
   means to transmit a first signal comprising a first pair of frequencies followed by a second pair of frequencies, said first pair of frequencies being equally displaced in frequency a first constant amount above and below a suppressed carrier frequency and said second pair of frequencies being equally displaced in frequency a second constant amount above and below the same suppressed carrier frequency;
   means to produce a second signal also comprising a first pair of frequencies followed by a second pair of frequencies, one pair of said pairs of frequencies being equally spaced said first constant amount above and below a predetermined center frequency and the other pair of said pairs of frequencies being equally spaced said second constant amount above and below the same predetermined center frequency,
   means to receive said first signal after it has been reflected from an object being detected,
   means to combine said reflected first signal with said second signal to detect a frequency shift in said reflected first signal due to motion of an object being detected in said given range interval.

8. The echo detection system of claim 7; wherein:
   the time relationship between said first signal and said second signal determines the range interval being scanned.

9. An echo detection system for detecting the radial velocities or targets in predetermined range intervals comprising:
   means to transmit a first signal comprising a first pair of frequencies followed by a second pair of frequencies, said first pair of frequencies being equally spaced a first amount above and below a suppressed carrier frequency and said second pair of frequencies being equally spaced a second amount above and below the same supressed carrier frequency;
   means to produce a second signal also comprising a first pair of frequencies followed by a second pair of frequencies, said first pair of frequencies being equally spaced said first amount above and below a center frequency and said second pair of frequencies being equally spaced said second amount above and below the same center frequency,
   means to produce a third signal comprising the same frequency pairs as said second signal but displaced in time with respect to said second signal,
   means to receive said first signal after it has been reflected from an object being detected,
   means to combine said reflected first signal with said second signal to detect frequency shifts in said reflected first signal due to motion of an object being detected in a first range interval; and
   means to combine said reflected first signal with said third signal to detect frequency shifts in said reflected first signal due to motion of an object being detected in a second range interval.

10. A pulse echo detection system comprising:
    means to transmit a first double-sideband-suppressed-carrier signal comprising at least two sequential pulses, one of said pulses comprising a first pair of side frequencies spaced a first predetermined amount on each side of said carrier frequency and the other of said pulses containing a second pair of side frequencies spaced a second predetermined amount of each side of said carrier frequency;

means to produce a second double-sideband-suppressed-carrier signal comprising at least two sequential portions, one of said two sequential portions comprising a first pair of side frequencies spaced said first predetermined amount on each side of the carrier frequency of said second double-sideband-suppressed-carrier signal and the other of said two sequential portions comprising a second pair of side frequencies spaced said second predetermined amount on each side of the carrier frequency of said second double-sideband-suppressed-carrier signal;

means to receive said first signal after it is reflected from an object being detected; and means to compare said reflected first signal with said second signal to detect frequency differences between said signals.

References Cited
UNITED STATES PATENTS

| | | | |
|---|---|---|---|
| 3,163,862 | 12/1964 | Jenny | 343—17.2 X |
| 3,168,735 | 2/1965 | Cartwright | 343—14 X |
| 3,179,935 | 4/1965 | Blass | 343—14 |

RODNEY D. BENNETT, *Primary Examiner.*

J. P. MORRIS, *Assistant Examiner.*